United States Patent [19]
Kazakis et al.

[11] Patent Number: 5,927,399
[45] Date of Patent: Jul. 27, 1999

[54] AFTERCOOLER WITH INTEGRAL BYPASS LINE

[75] Inventors: Michael V. Kazakis; Scott M. Trapp, both of Simpsonville, S.C.

[73] Assignee: Westinghouse Air Brake Company, Wilmerding, Pa.

[21] Appl. No.: 08/842,685

[22] Filed: Apr. 15, 1997

[51] Int. Cl.[6] .................................................. G05D 15/00
[52] U.S. Cl. ......................... 165/284; 165/47; 165/231; 417/243; 123/563
[58] Field of Search .......................... 165/47, 300; 62/93, 62/92; 417/243, 14, 44.1, 18, 36; 123/563

[56] References Cited

U.S. PATENT DOCUMENTS

| | | | |
|---|---|---|---|
| 1,594,976 | 10/1926 | Parsons | 165/47 |
| 1,805,101 | 3/1931 | Modine | 417/243 |
| 2,304,151 | 3/1942 | Crawford | 62/92 |
| 2,392,213 | 6/1946 | Cruzan | 165/284 |
| 2,693,247 | 9/1954 | Olstad et al. | 62/92 |
| 2,783,616 | 3/1957 | Dodge | 62/92 |
| 2,784,571 | 3/1957 | Schelp | 62/92 |
| 4,000,725 | 1/1977 | Harris | 123/563 |
| 4,237,696 | 12/1980 | Coblentz | 62/93 |
| 4,317,439 | 3/1982 | Emmerling | 123/563 |
| 4,830,580 | 5/1989 | Hata et al. | 417/243 |
| 4,838,343 | 6/1989 | Bogue | 165/47 |
| 5,106,270 | 4/1992 | Goettel et al. | 417/372 |
| 5,184,773 | 2/1993 | Everingham | 165/284 |
| 5,375,580 | 12/1994 | Stolz et al. | 123/563 |
| 5,390,646 | 2/1995 | Swenson | 123/563 |
| 5,492,103 | 2/1996 | Goto | 123/563 |
| 5,546,975 | 8/1996 | Pernet | 123/563 |
| 5,669,338 | 9/1997 | Prible et al. | 123/563 |

FOREIGN PATENT DOCUMENTS

| | | | |
|---|---|---|---|
| 62-48923 | 3/1987 | Japan | 123/563 |
| 63-198724 | 8/1988 | Japan | 123/563 |
| 4-66723 | 3/1992 | Japan | 123/563 |
| 1255956 | 12/1971 | United Kingdom | 123/563 |

*Primary Examiner*—Ira S. Lazarus
*Assistant Examiner*—Terrell McKinnon
*Attorney, Agent, or Firm*—James Ray & Associates

[57] ABSTRACT

An aftercooler apparatus condenses vapor in untreated gas discharged from a compressor of a gas drying system. The apparatus includes a radiator, a bypass line and a bypass valve. The radiator features a first inlet, a second inlet and an outlet. The first inlet connects to the compressor from which it receives the untreated gas. The outlet connects to the next component in the gas drying system. The radiator condenses the vapor suspended in the untreated gas and passes aftercooled gas resulting therefrom via its outlet to the next component. The bypass line, through which the untreated gas may flow, connects at one end between the compressor and the first inlet and at another end to the second inlet. The bypass valve senses the difference in pressure between the first inlet and the outlet. The bypass valve also controls the flow of the untreated gas in response to the difference in pressure. When the difference in pressure is below a preset value, the bypass valve closes thereby allowing the untreated gas to flow into the first inlet and through the radiator wherefrom the aftercooled gas passes to the next component while carrying therewith the condensed moisture for expulsion from the system. When the difference in pressure reaches or exceeds the preset value, the bypass valve opens thereby diverting the flow of the untreated gas through the bypass line and into the second inlet so as to defrost in the radiator frozen moisture accumulated therein that caused the difference in pressure.

17 Claims, 1 Drawing Sheet

AFTERCOOLER WITH INTEGRAL BYPASS LINE

FIELD OF THE INVENTION

The present invention generally relates to an apparatus for condensing vapor suspended in untreated air discharged from a compressor of an air drying system. More particularly, the present invention relates to an aftercooler apparatus that takes advantage of the relative warmth of such untreated air to defrost portions of the aftercooler apparatus in which condensed moisture has accumulated and frozen and thereby caused a restriction in the flow of air through the aftercooler apparatus.

BACKGROUND OF THE INVENTION

Air drying systems are well known and practiced in a wide variety of technical fields including the railroad industry. An air drying system is designed to provide cleaned and dried compressed air to a pneumatic system. One example of such a pneumatic system is an air brake system of a railroad train.

An air drying system of a train typically includes a compressor, an air dryer unit and an aftercooler device typically situated between the output of the compressor and the intake port of the air dryer unit. Usually driven by an engine or an electric motor either directly or through a belt and pulley mechanism, the compressor is essentially an air pump that supplies the compressed air to operate the air brake system and other air actuated equipment on the train such as contactors, switches, reversers, bell ringers, etc. The compressed air discharged from the compressor, however, typically holds or entraps an unacceptably high quantity of moisture in the form of vapor. This untreated air should ideally be stripped of all of its moisture before it is inducted into the air dryer unit. An example of an air dryer unit can be found in U.S. application Ser. No. 08/597,076 which is incorporated herein by reference.

While air dryer units are quite efficient in removing condensed moisture and other airborne particulates from a stream of compressed air passing through them, they are not particularly effective in removing vaporized moisture suspended in the compressed air. Consequently, an aftercooler device is typically inserted between the compressor and the air dryer unit to condense the vapor suspended in the air stream. One example of an aftercooler device can be found in U.S. Pat. No. 5,106,270 which is incorporated herein by reference.

An aftercooler device typically includes a radiator unit and, perhaps, a bypass line along with a bypass valve. The radiator unit includes an inlet connected to the output of the compressor and an outlet connected to the intake port of the air dryer unit of the air drying system. The untreated air discharged from the compressor flows into the inlet and through the radiator unit. The radiator unit has sufficient radiating surface between the inlet and outlet to cool the compressed air from the temperature at which it was discharged from the compressor to generally that within approximately 5 degrees Fahrenheit of ambient air temperature. Air flow from a fan or other mechanism is directed over the radiating surface of the radiator unit thereby cooling the radiator unit and the untreated compressed air flowing through the radiator unit. This causes the vaporized moisture necessarily entrapped in compression to condense. From the outlet of the radiator unit passes the compressed air less the vapor that previously was suspended in it. This stream of dryer compressed air, hereinafter referred to as aftercooled air, also forcibly carries with it the condensed moisture into the air dryer unit. The air dryer unit then removes from the stream of aftercooled air passing through it the condensed moisture and the other airborne particulates.

While operating in environments in which the temperature is sufficiently above the freezing point of water, the aftercooler device described above works quite well. When operated at temperatures near or below the freezing point, however, the condensed moisture tends to freeze within the passages of the radiator unit thereby restricting the flow of air through the radiator unit. One solution to this freezing problem is just to stop the flow of air through the aftercooler device until the frozen condensate within the radiator unit melts. It is obviously quite unacceptable, however, to disrupt long the flow of compressed air to such a critically important system as the air brake system of a railroad train. Consequently, practitioners in the air drying art have employed the bypass line along with the bypass valve mentioned previously to address this problem.

The bypass line and bypass valve of prior art aftercooler devices are used to bypass the radiator unit under these circumstances. The bypass line in these prior art systems connects at one end between the output of the compressor and the inlet of the radiator unit and at the other end between the outlet of the radiator unit and the intake port of the air dryer unit. The bypass valve connects to the bypass line at the one end at which point it controls whether the untreated air from the compressor flows into the radiator unit or into the air dryer unit.

Regarding the operation of the prior art aftercooler device in cold environments, as the condensed moisture starts to freeze within and thus restrict the passages of the radiator unit, the pressure drop across the radiator unit increases. The bypass valve senses this difference in pressure between the inlet and the outlet of the radiator unit. While the pressure difference is below a threshold value, the bypass valve remains closed. This allows the untreated air to flow through the radiator unit. The aftercooled air from the outlet of the radiator unit then passes to the air dryer unit thereby carrying therewith the condensed moisture for expulsion from the air drying system. When the pressure difference rises above the threshold valve, the bypass valve opens. The open bypass valve completely diverts flow of the untreated air through the bypass line and directly into the air dryer unit. The bypass line via the bypass valve thus completely circumvents the radiator unit until the pressure difference reduces to an acceptable level (i.e., until the radiator unit thaws).

There are several disadvantages inherent to the prior aftercooler device. Perhaps the most apparent disadvantage is the amount of time that it takes to thaw the radiator unit. The time it takes to defrost the radiator unit has proven to be quite unacceptable, especially, in colder environments. Of greatest concern is the quantity of untreated air that is inducted into the air drying system while the radiator unit thaws. Without the aid of the aftercooler device by which to condense the vapor in the incoming stream of untreated air, the air drying system is unable to remove all, or nearly all, of the moisture from the incoming air stream. This excess moisture contaminates the air brake system and the other air actuated equipment on the train and can, especially over time, adversely affect their operation.

Practitioners in the air drying art understand that it is necessary to defrost the radiator unit when air flow through its passages becomes overly restricted. The pneumatic system to which the air drying system is connected, however, should not be deprived of a steady supply of cleaned and dried compressed air for too long a time. Under cold environmental conditions, the prior art aftercooler device does deprive the pneumatic system of such cleaned and dried air for an unacceptably long time. The performance of the prior art aftercooler device has thus proven to be quite unsatisfactory in the rail transportation industry under the aforementioned circumstances.

It would therefore be quite desirable to devise an aftercooler apparatus that would reduce the amount of time that is needed to defrost the radiator unit. An air drying system featuring such an aftercooler apparatus would not spend so much time defrosting its radiator unit. Consequently, an air drying system so equipped would provide to the pneumatic system to which it is connected aftercooled air more often. Equally important is that an air drying system so equipped would not induct as much moisture bearing air because it need not defrost itself so often. An air drying system equipped with the present aftercooler invention would more efficiently exsiccate air than an air drying system having the prior art aftercooler device. The pneumatic system to which the improved air drying system is attached would encounter less moisture and be less likely to suffer the adverse affects of repeated exposure to such moisture.

The detailed description set forth below makes clear that the aftercooler apparatus of the present invention can be applied to a wide variety of pneumatic systems. Typical of the types of pneumatic systems to which the aftercooler apparatus could be applied include the air brake systems of passenger and freight railroad trains, subway trains and various other types of rail related transportation systems. Further examples include the air brake systems of various truck transport vehicles. Other types of pneumatic systems to which the aftercooler apparatus could be applied may be found outside the transportation field. Obvious modifications may be necessary, though, depending upon the specific application in which the present invention is employed.

It should be noted that the foregoing background information is provided to assist the reader in understanding the instant invention. Accordingly, any terms used herein are not intended to be limited to any particular narrow interpretation unless specifically stated otherwise in this document.

OBJECTIVES OF THE INVENTION

It is, therefore, a primary objective of the present invention to provide an aftercooler apparatus that takes advantage of the relative warmth of untreated gas discharged from a compressor of a gas drying system to defrost condensed moisture that has accumulated and frozen within the apparatus and caused a restriction in the flow of gas through the aftercooler apparatus.

Another objective of the present invention is to provide an aftercooler apparatus featuring a radiator unit that condenses vapor from a stream of untreated air and a bypass mechanism that diverts the stream of untreated air to defrost particular portions of the radiator unit in which condensed moisture has accumulated and frozen and caused a restriction in the flow of air through the radiator unit.

Yet another objective of the present invention is to provide an aftercooler apparatus that includes a radiator unit featuring a second inlet, located near a portion of the radiator unit in which condensed moisture is most prone to accumulate and freeze, into which can be diverted the relatively warm untreated air to defrost the portion when condensed moisture has accumulated and frozen and thereby caused a restriction in the flow of air through the radiator unit.

In addition to the objectives and advantages listed above, various other objectives and advantages of the present invention will become more readily apparent to persons skilled in the relevant art from a reading of the detailed description section of this document. The other objectives and advantages will become particularly apparent when the detailed description is considered along with the attached drawing and with the appended claims.

SUMMARY OF THE INVENTION

In a presently preferred embodiment, the present invention provides an aftercooler apparatus for condensing vapor suspended in untreated air discharged from a compressor of an air drying system. The aftercooler apparatus comprises a radiator unit, a bypass line and a bypass valve. The radiator unit features a first inlet, a second inlet and an outlet. The first inlet connects to the compressor from which the untreated air is received. The second inlet is located near a portion of the radiator unit in which the moisture, once condensed, is most prone to accumulate and freeze. The outlet connects to the next component in the air drying system. The radiator unit condenses the vapor suspended in the untreated compressed air then passes aftercooled air resulting therefrom via its outlet to the next component in the air drying system. The bypass line, through which the untreated air may flow, connects at one end between the compressor and the first inlet and at another end to the second inlet. The bypass valve senses the difference in pressure between the first inlet and the outlet. The bypass valve also controls the flow of the untreated air in response to the difference in pressure. When the difference in pressure is below a preset value, the bypass valve closes thereby allowing the untreated air to flow into the first inlet and through the radiator unit wherefrom the aftercooled air passes to the next component while carrying therewith the condensed moisture for expulsion from the air drying system. When the difference in pressure reaches or exceeds the preset value, the bypass valve opens thereby diverting some of the flow of the untreated air through the bypass line and into the second inlet so as to defrost moisture that has accumulated and frozen in the radiator unit. It is this frozen moisture that restricts the flow of air through the radiator unit thereby producing the aforementioned difference in pressure.

DETAILED DESCRIPTION OF THE INVENTION

Figure 1:
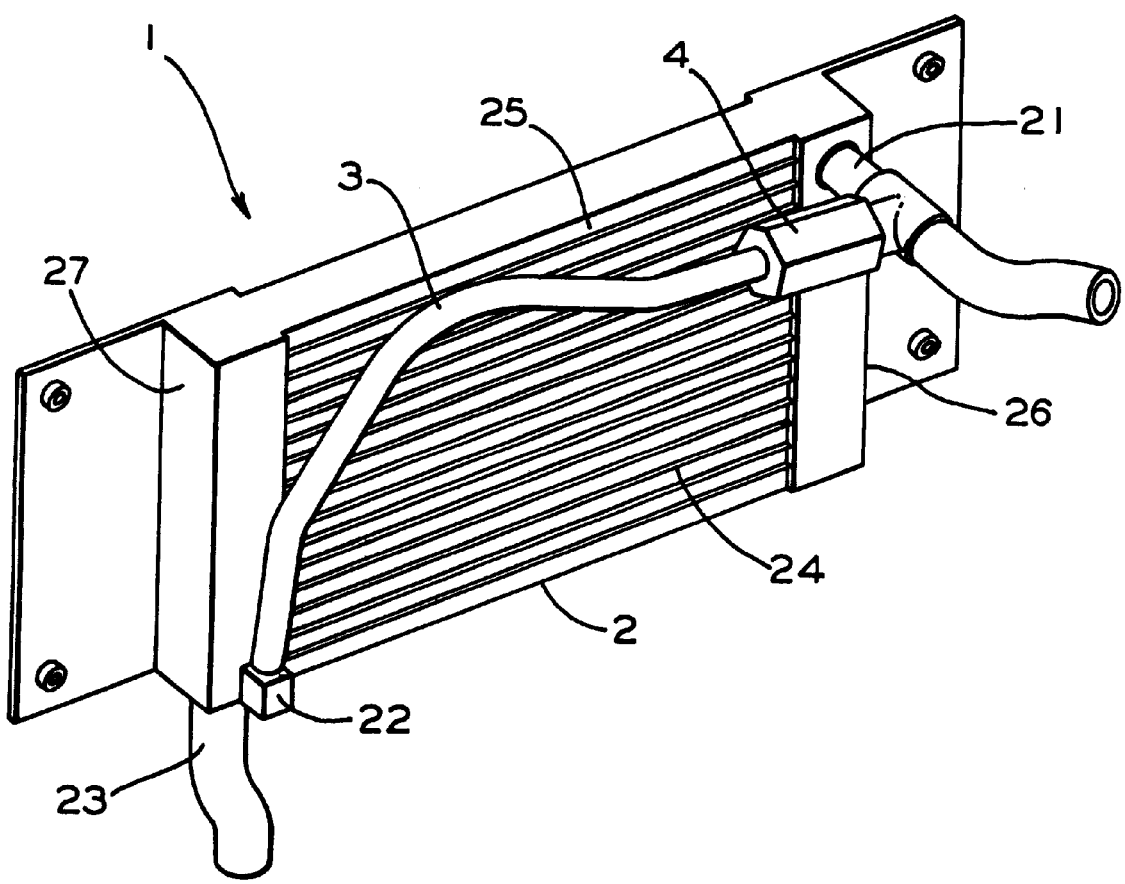
FIG. 1 is a perspective view of an aftercooler apparatus according to the present invention.

Before describing the present invention in detail, the reader is advised that, for the sake of clarity and understanding, identical components having identical functions in the accompanying drawing have been marked where possible with the same reference numerals in the Figure provided in this document.

Referring now to the sole drawing, FIG. 1 illustrates the essential details of a presently preferred embodiment of an aftercooler apparatus according to the present invention. The aftercooler apparatus, generally designated 1, removes vapor from a stream of untreated air discharged from a compressor of an air drying system. The aftercooler apparatus 1 removes this vapor from the untreated compressed air by cooling the air as explained below.

The aftercooler apparatus 1 comprises a radiator unit 2, a bypass line 3 and a bypass valve 4. The radiator unit 2 features a first inlet 21, a second inlet 22, an outlet 23 and a radiating surface 24. The first inlet 21 connects to the output of the compressor (not shown) from which the untreated compressed air is received. The second inlet 22 is preferably located near a portion of the radiator unit 2 in which the moisture, once condensed, is most prone to accumulate and freeze. The outlet 23 connects to the intake port of the next component in the air drying system (not shown). The next component will typically be the air dryer unit (not shown) of the air drying system, as mentioned previously. The next component could, alternatively, be the intake port of a main storage reservoir. The radiating surface 24 is situated between the first inlet 21 and the outlet 23 of the radiator unit 2. As is well known in the art, the radiating surface 24 includes internal passages through which the stream of air flows and which allow the comparative warmth borne by the air to be radiated to atmosphere.

The radiator unit 2 may take the form of any number of known constructions. The radiator unit 2, for example, may have an aluminum fin core 25 to which connects at its ends an inlet header 26 and an outlet header 27, respectively. The inlet header 26 connects to the first inlet 21 and the outlet header 27 connects to the outlet 23. The second inlet 22, as mentioned previously, is preferably located near the portion of radiator unit 2 in which the condensed moisture is most prone to accumulate and freeze. This portion may be part of the outlet header 27. The internal passages of the aluminum fin core 25 may be tube-like passages placed in parallel to one another. Each tube-like passage may be made up of short tubelets which form staggered passageways having a predetermined height. Further examples as to radiator unit construction can be found in the aforementioned U.S. Pat. No. 5,106,270.

The bypass line 3 connects at one end between the output of the compressor and the first inlet 21 of radiator unit 2 and at the other end to the second inlet 22 of radiator unit 2. The bypass line 3 preferably takes the form of a flexible hose. It may, however, take the form of an inflexible pipe. The bypass valve 4 may be selected from a variety of commercially available valves whose construction and operation are known in the relevant art.

The bypass valve 4 connects between the bypass line 3 and the point at which the output of the compressor and the first inlet 21 of radiator unit 2 connect. Positioned at this spot, the bypass valve 4 can sense the difference in pressure between the first inlet 21 and generally the outlet 23 of radiator unit 2 assuming, of course, that the second inlet 22 is located near the outlet 23 of radiator unit 2. Depending on the magnitude of the difference in pressure, the bypass valve 4 will allow the relatively warm untreated air from the compressor to flow into either the first inlet 21 or the second inlet 22 of radiator unit 2. The bypass valve 4 thus controls the flow of the untreated air from the compressor into the inlets of radiator unit 2. The exact point at which bypass valve 4 connects to the bypass line 3, the compressor and the first inlet 21 of radiator unit 2 may, of course, be changed depending on how one wishes to configure these connections.

Regarding the operation of the aftercooler apparatus 1, the stream of untreated air flows from the compressor output to the bypass valve 4. When bypass valve 4 senses that the difference in pressure is below a preset value, the bypass valve 4 closes thereby allowing the untreated air to flow into the first inlet 21 and through radiator unit 2. The air then flows through the internal passages of radiator unit 2 wherein the radiating surface 24 allows the heat carried by the flowing air to be radiated to atmosphere. Air flow from a fan or other mechanism may be directed over radiating surface 24 to cool the radiating surface 24 and the compressed air flowing through radiator unit 2. In this manner, the radiator unit 2 cools the air from the temperature at which it was discharged from the compressor to generally that of atmosphere. This causes the vaporized moisture necessarily entrapped in compression to condense. From the outlet of radiator unit 2 then passes the compressed air less the vapor that previously was suspended in it. This stream of aftercooled air also forcibly carries with it the condensed moisture into the next component of the air drying system. The next component, such as the main reservoir or the air dryer unit, may have a drain port through which to remove from the stream of aftercooled air passing through it the condensed moisture and the other particulates. The aftercooler apparatus 1 operates in this manner as long as the aforementioned difference in pressure remains below the preset value.

When the aftercooler apparatus 1 operates in colder environments, the condensed moisture may start to freeze within and obstruct the internal passages of radiator unit 2. The portion of radiator unit 2 in which condensed moisture is most likely to accumulate and freeze is that where the second inlet 22 is preferably located. As the internal passages in this portion of radiator unit 2 become more and more obstructed with frozen condensate, the bypass valve 4 senses the corresponding increase in the magnitude of the aforementioned difference in pressure. When this difference in pressure reaches or exceeds the preset value, bypass valve 4 opens. Once open, the bypass valve 4 then diverts some of the flow of the untreated air through bypass line 3 and into the second inlet 22 of radiator unit 2. The comparatively warm compressed air entering the second inlet 22 quickly thaws the frozen condensate that accumulated in this portion of the radiator unit 2. The time it takes for the frozen condensate to thaw in these passages of radiator unit 2 is quick when compared to the time it takes for thawing with the prior art aftercooler device. The bypass line 3 via bypass valve 4 thus partially circumvents radiator unit 2 while the obstruction melts and the difference in pressure reduces to a level lower than the preset value.

An air drying system equipped with the aftercooler apparatus 1 thus will more efficiently exsiccate air than an air drying system having the prior art aftercooler device. The pneumatic system to which the aftercooler apparatus 1 is attached will encounter less moisture and be less likely to suffer the adverse affects of repeated exposure to such moisture.

Regarding the preferred location of the second inlet 22 of the radiator unit, FIG. 1 shows the second inlet located just upstream of the outlet 23 of the radiator unit 2. This portion of radiator unit 2 typically bears the coldest temperatures suffered by the radiator unit 2. This is because the air flowing through this portion has already flowed through nearly the entire radiator unit 2 and, therefore, has had the vast majority of its warmth already radiated to atmosphere. In this example, the end of the radiator unit 2 nearest the compressor is quite warm in comparison to the opposite end because the air flowing at this end has not yet radiated its heat to atmosphere. It is for this reason that the relatively warm untreated air found at one end of radiator unit 2 is diverted to and used to thaw the portion of the radiator unit 2 located near its opposite end.

It should be apparent to practitioners skilled in the relevant art that the preferred location of the second inlet in the radiator unit 2 may vary depending on any one or more of a number of factors. For example, the design of a particular radiator unit may affect which portion of the unit is most likely to encounter the coldest temperatures. The manner in which a radiator unit is used or the way in which it is incorporated into an air drying system may also dictate another location for the second inlet. Though the second inlet 22 is shown in FIG. 1 as being near the outlet 23 of radiator unit 2, it should be understood, it may be located at another more preferred site on the radiator unit 2.

While the presently preferred embodiment for carrying out the present invention has been set forth in detail according to the Patent Act, those persons of ordinary skill in the technical art to which this invention pertains will recognize various alternative ways of practicing the invention without departing from the spirit and scope of the appended claims. Those of ordinary skill will also recognize that the foregoing description is merely illustrative and is not intended to limit any of the following claims to any particular narrow interpretation.

Accordingly, to promote the progress of science and useful arts, we secure for ourselves by Letters Patent exclusive rights to all subject matter embraced by the following claims for the time prescribed by the Patent Act.

We claim:

1. An aftercooler apparatus for condensing vapor in untreated gas discharged from a compressor of a gas drying system, said aftercooler apparatus comprising:
   (a) a radiator unit for condensing said vapor suspended in said untreated gas and passing aftercooled gas resulting therefrom to a next component of said gas drying system, said radiator unit featuring (i) a first inlet connected to said compressor from which said untreated gas is received, (ii) an outlet connected to said next component and (iii) a second inlet located near a portion of said radiator unit in which condensed moisture is most prone to accumulate and freeze;
   (b) a bypass line, through which said untreated gas may flow, connected at one end between said compressor and said first inlet and at another end to said second inlet; and
   (c) a bypass valve for sensing difference in pressure between said first inlet and approximately said outlet and for controlling flow of said untreated gas in response to said difference in pressure such that (i) when said difference in pressure is below a preset value, said bypass valve is closed thereby allowing said untreated gas to flow into said first inlet and through said radiator unit wherefrom said aftercooled gas passes to said next component while carrying therewith said condensed moisture for expulsion from said gas drying system and (ii) when said difference in pressure reaches or exceeds said preset value, said bypass valve opens thereby diverting said flow of said untreated gas through said bypass line and into said second inlet so as to defrost in said radiator unit frozen condensed moisture accumulated therein that has restricted flow therethrough and produced said difference in pressure.

2. The aftercooler apparatus as recited in claim 1 wherein said condensed moisture accumulated in said radiator unit is forced by said flow of said after cooled gas into said next component wherein said condensed moisture is expelled from said gas drying system.

3. The aftercooler apparatus as recited in claim 1 wherein said bypass line is a flexible hose.

4. The aftercooler apparatus as recited in claim 3 wherein said bypass valve mechanically determines said difference in pressure between said first inlet and approximately said outlet.

5. The aftercooler apparatus as recited in claim 1 wherein said radiator unit includes:
   (a) an inlet header connected to and for receiving said untreated gas from said first inlet;
   (b) an outlet header connected to and for passing said aftercooled gas to said outlet, said outlet header also connected to and for receiving said untreated gas from said second inlet such that said second inlet is generally located upstream of said outlet; and
   (c) a finned core connected between said inlet header and said outlet header through which to condense said vapor suspended in said untreated gas.

6. An aftercooler apparatus for condensing vapor in untreated gas discharged from a compressor of a gas drying system, said aftercooler apparatus comprising:
   (a) a radiator unit featuring a first inlet connected to said compressor from which said untreated gas is received, a second inlet and an outlet connected to a next component in said gas drying system, said radiator unit for condensing said vapor suspended in said untreated gas and passing aftercooled gas resulting therefrom via said outlet to said next component;
   (b) a bypass line, through which said untreated gas may flow, connected at one end between said compressor and said first inlet and at another end to said second inlet; and
   (c) a bypass valve for sensing difference in pressure between said first inlet and approximately said outlet and for controlling flow of said untreated gas in response to said difference in pressure such that (i) when said difference in pressure is below a preset value, said bypass valve closes thereby allowing said untreated gas to flow into said first inlet and through said radiator unit wherefrom said aftercooled gas passes to said next component and (ii) when said difference in pressure reaches or exceeds said preset value, said bypass valve opens thereby allowing said flow of said untreated gas through said bypass line so as to defrost in said radiator unit frozen moisture accumulated therein that has restricted flow therethrough and produced said difference in pressure between said first inlet and said outlet of said radiator unit.

7. The aftercooler apparatus as recited in claim 6 wherein said bypass line is a flexible hose.

8. The aftercooler apparatus as recited in claim 6 wherein said bypass valve mechanically determines said difference in pressure between said first inlet and approximately said outlet.

9. The aftercooler apparatus as recited in claim 6 wherein said second inlet of said radiator unit is located near a portion of said radiator unit in which condensed moisture is most prone to accumulate and freeze.

10. The aftercooler apparatus as recited in claim 9 wherein said radiator unit includes:
    (a) an inlet header connected to and for receiving said untreated gas from said first inlet;
    (b) an outlet header connected to and for passing said aftercooled gas to said outlet, said outlet header also connected to and for receiving said untreated gas from said second inlet such that said second inlet is generally located upstream of said outlet; and
    (c) a finned core connected between said inlet header and said outlet header through which to condense said vapor suspended in said untreated gas.

11. An aftercooler apparatus for condensing vapor in untreated gas discharged from a compressor of a gas drying system, said aftercooler apparatus comprising:

(a) a radiator unit featuring (i) a first inlet connected to said compressor from which said untreated gas is received, (ii) a second inlet and (iii) an outlet connected to a next component in said gas drying system, said radiator unit for condensing said vapor suspended in said untreated gas and passing aftercooled gas resulting therefrom via said outlet to said next component;

(b) a bypass line, through which said untreated gas may flow, connected at one end between said compressor and said first inlet and at another end to said second inlet; and (c) a bypass valve for sensing difference in pressure between said first inlet and said outlet and for controlling flow of said untreated gas in response to said difference in pressure such that (i) when said difference in pressure is below a preset value, said bypass valve is closed thereby allowing said untreated gas to flow into said first inlet and through said radiator unit wherefrom said aftercooled gas passes to said next component and (ii) when said difference in pressure reaches or exceeds said preset value, said bypass valve opens thereby diverting some of the flow of said untreated gas through said bypass line and into said second inlet so as to defrost in said radiator unit frozen moisture accumulated therein that has restricted flow therethrough and produced said difference in pressure.

12. The aftercooler apparatus as recited in claim 11 wherein said second inlet of said radiator unit is located near a portion of said radiator unit in which condensed moisture is most prone to accumulate and freeze.

13. The aftercooler apparatus as recited in claim 12 wherein said radiator unit includes:

(a) an inlet header connected to and for receiving said untreated gas from said first inlet;

(b) an outlet header connected to and for passing said aftercooled gas to said outlet, said outlet header also connected to and for receiving said untreated gas from said second inlet such that said second inlet is generally located upstream of said outlet; and (c) a finned core connected between said inlet header and said outlet header through which to condense said vapor suspended in said untreated gas.

14. The aftercooler apparatus as recited in claim 13 wherein said bypass line is a flexible hose.

15. The aftercooler apparatus as recited in claim 14 wherein said bypass valve mechanically determines said difference in pressure between said first inlet and said outlet.

16. The aftercooler apparatus as recited in claim 15 wherein said next component of said gas drying system is a gas dryer unit.

17. The aftercooler apparatus as recited in claim 15 wherein said next component of said gas drying system is a main reservoir.

* * * * *